3,536,728
1,2,3-BENZOTHIADIAZOLE HERBICIDES
John Yates, Whitstable, Kent, and Ernest Haddock, Sheerness, Kent, England, assignors to Shell Oil Company, New York, N.Y., a corporation of Delaware
No Drawing. Filed July 26, 1968, Ser. No. 747,811
Claims priority, application Great Britain, Aug. 3, 1967, 35,758/67
Int. Cl. C07d 91/56
U.S. Cl. 260—304         8 Claims

ABSTRACT OF THE DISCLOSURE 1,2,3-benzothiadiazoles such as 6-[1-ethoxycarbonyl)ethoxy]-5-chloro-acylalkoxy-1,2,3-benzothiadiazole, useful as herbicides.

BACKGROUND OF THE INVENTION

Field of the invention

This invention relates to novel 1,2,3-benzothiadiazoles.

SUMMARY OF THE INVENTION

It has now been discovered that certain novel 1,2,3-benzothiadiazoles have herbicidal activity. These compounds can be described by the formula

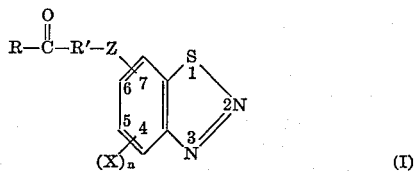

(I)

wherein R is hydroxy, alkoxy, amino, monoalkylamino or dialkylamino; R' is alkylene; Z is oxy (—O—), thio (—S—), or imino

X is halogen; i.e. fluorine, chlorine, bromine or iodine; nitro or alkyl; $n$ is 0, 1, 2, or 3, and the alkali metal and amine salts thereof when R is hydroxy.

This invention accordingly is the new class of 1,2,3-benzothiadiazoles, their use as herbicides and herbicidal formulations containing them.

Examples of this novel class of compounds include 4-ethoxycarbonylmethoxy-5-chloro-1,2,3-benzothiadiazole;
6-[1-(carboxy)ethoxy]-1,2,3-benzothiadiazole;
6-methylcarbamoylpropylamino-5,7-dinitro-1,2,3-benzothiadiazole;
5-dipropylcarbamoylethylthio-4-chloro-1,2,3-benzothiadiazole;
6-carbamoylbutoxy-7-nitro-1,2,3-benzothiadiazole;
7-ethoxycarboxymethylthio-1,2,3-benzothiadiazole;
6-ethylcarbamoylmethylamino-7-chloro-1,2,3-benzothiadiazole;
6-carboxymethylthio-7-nitro-1,2,3-benzothiadiazole;
6-[1-(carboxy)ethylamino]-4-chloro-1,2,3-benzothiadiazole;
6-propoxycarboxypropylamino-5-ethyl-1,2,3-benzothiadiazole.

DESCRIPTION OF THE PREFERRED EMBODIMENT

In Formula I when R is alkoxy, monoalkylamino or dialkylamino, all of the alkyl moieties suitably have from 1–10 carbon atoms, that is methyl, ethyl, propyl, isopropyl, butyl, tert.-butyl, sec-butyl, isobutyl, pentyl, hexyl, heptyl, octyl, nonyl, decyl and the like. Preferably each contains 1–4 carbon atoms, and most preferably contains 1–2 carbon atoms.

R' suitably is alkylene of 1–6 carbon atoms such as methylene, ethylene, ethylidene, trimethylene, trimethylidene, tetramethylene, butylidene, pentamethylene, pentylidene, hexamethylene, hexylidene, and the like, but preferably alkylene of 1–4 carbon atoms and more preferably methylene, ethylidene or trimethylene.

While Z may be either oxy, thio or imino, it preferably represents oxy.

When X is halogen, preferably it is middle halogen, i.e. chlorine or bromine, with chlorine preferred; when X is alkyl, the alkyl groups are suitably of 1–6 carbon atoms, preferably 1–4 carbon atoms, with methyl preferred.

While the number of X substituents may vary from zero to three ($n=0$, 1, 2 or 3) preferably there are not more than two ($n=0$, 1 or 2). When $n$ is 1, preferably the X substituent is in the 5- or 7-position, with the 5-position preferred.

The R—CO—R'—Z— moiety may be in the 4-, 5-, 6- or 7-position, but preferably it is in the 6-position.

When R' is alkylene in which there is an asymmetric carbon atom, the compound will exist in the optically active d-(dextro) or l-(levo) stereoisomeric forms as well as in racemic mixtures thereof. Both stereoisomers, together with the racemic mixture, are within the scope of the invention.

Because of their generally high herbicidal activity, the 1,2,3-benzothiadiazoles of the following formula are especially preferred.

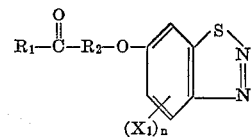

(II)

wherein $R_1$ is alkoxy of 1–4 carbon atoms, preferably ethoxy, or hydroxy; $R_2$ is alkylene of 1–4 carbon atoms, particularly methylene, ethylidene or trimethylene, and preferably methylene or ethylidene; $X_1$ is middle halogen, preferably chlorine, or methyl and is preferably in the 5-position; and $n$ is 0 or 1. Examples of this preferred class include 6-ethoxycarbonylmethoxy-1,2,3-benzothiadiazole;
6-ethoxycarbonylmethoxy-5-chloro-1,2,3-benzothiadiazole; and
6-[1-(ethoxycarbonyl)ethoxy]-5-chloro-1,2,3-benzothiadiazole.

Compounds of this invention may be readily prepared by conventional methods known in the art.

Thus, where Z is imino or thio and R is hydroxy, amino, mono- or dialkylamino, the compound may be prepared by reacting, in the presence of a base, the appropriate halo-substituted (preferably chloro substituted)-1,2,3-benzothiadiazole with the appropriate acid derivative of the formula R—CO—R'—ZH where R and Z are as just defined. Compounds wherein R is alkoxy may be prepared by reacting the corresponding 1,2,3-benzothiadiazole in which R is hydroxy with thionyl chloride and then the appropriate alkanol. Compounds wherein R is mono- or dialkylamino may alternatively be prepared by reacting the corresponding 1,2,3-benzothiadiazole in which R is hydroxy with thionyl chloride and the appropriate mono- or dialkylamine.

Compounds in which R is alkoxy and Z is an oxygen atom may be prepared from the appropriate hydroxy-substituted 1,2,3-benzothiadiazole by reaction with a haloalkanoic ester of the formula R—CO—R'—Hal (wherein R is alkoxy and Hal is a halogen atom) in the presence of a base, such as sodium methoxide, and usually an organic solvent such as ethanol.

Compounds wherein R is hydroxy and Z is an oxygen atom may be most readily prepared by saponification of the corresponding 1,2,3-benzothiadiazole in which R is an alkoxy; such saponification is most conveniently carried out by refluxing with a solution of an alkali metal hydroxide such as potassium of sodium hydroxide. These saponification products may then be reacted with thionyl chloride and ammonia, mono- or dialkylamines to obtain compounds wherein R is amino, mono- or dialklyamino and Z is an oxygen atom.

The biologically active compounds of the invention are of particular interest for their herbicidal activity, which is in many cases a selective growth-regulant activity analogous to the well-known "hormone" weed killers. Accordingly, plant growth control may be attained by subjecting the plants to the effect of 1,2,3-benzothiadiazoles or herbicidal compositions comprising at least one 1,2,3-benzothiadiazole with an adjuvant therefor.

The adjuvant may be a carrier which as used herein means a material, which may be inorganic or organic and of synthetic or natural origin, with which the active compound is mixed or formulated to facilitate its application to the plant, seed, soid or other object to be treated, or its storage, transport or hondling. The carrier may be a solid or a fluid. Any of the material usually applied in formulating pesticides may be used as carrier.

Examples of suitable solid carrier are silicates, clays, for example, kaolinite clay, synthetic hydrated silicon oxides, synthetic calcium silicates, elements such as for example, carbon and sulfur, natural and synthetic resins such as for example, coumarone resins, rosin, copal, shellac, dammar, polyvinyl chloride and styrene polymers and copolymers, solid polychlorophenols, bitumen, asphaltite, waxes such as for example, beeswax, paraffin wax, montan wax and chlorinated mineral waxes, and solid fertilizers, for example, superphosphates.

Examples of suitable fluid carriers are water, alcohols, such as for example, isopropanol, ketones such as for example, acetone, methyl ethyl ketone, methyl isobutyl ketone and cyclohexanone, ethers, aromatic hydrocarbons such as for example, benzene and toluene, petroleum fractions such as for example, kerosene, chlorinated hydrocarbons, such as for example, carbon tetrachloride, including liquefied normally vaporous gaseous compounds. Mixtures of different liquids are often suitable.

The adjuvant may be a surface-active agent, which may be a wetting agent, an emulsifying agent or a dispersing agent; it may be nonionic or ionic. Any of the surface-active agents usually applied in formulating herbicides or insecticides may be used. Examples of suitable surface-active agents are the sodium or calcium salts of polyacrylic acids, the condensation products of fatty acids or aliphatic amines or amides containing at least 12 carbon atoms in the molecule with ethylene oxide and or propylene oxide; partial esters of the above fatty acids with glycerol, sorbitan, sucrose or pentaerythritol; condensation products of alkyl phenols, for example p-octylphenol or p-octylcresol, with ethylene oxide and or propylene oxide; sulfates or sulfonates of these condensation products; and alkali metal salts, preferably sodium salts, of sulfuric or sulfonic acid esters containing at least 10 carbon atoms in the molecule, for example, sodium lauryl sulfate, sodium secondary alkyl sulfates, sodium salts of sulfonated castor oil, and sodium alkylaryl sulfonates such as sodium dodecylbenzene sulfonate.

The compositions of the invention may be formulated as wettable powders, dusts, granules, solutions, emulsifiable concentrates, emulsions and pastes. Wettable powders are usually compounded to contain 25, 50 or 75% of toxicant and usually contain in addition to solid carrier, 3–10% of a dispersing agent and, where necessary, 0–10% of stabilizer(s) and/or other additives such as penetrants or stickers. Dusts are usually formulated as a dust concentrate having a similar composition to that of a wettable powder but without a dispersant, and are diluted in the field with further solid carrier to give a composition usually containing ½–10% of toxicant. Granules are usually prepared to have a size between 10 and 100 BS mesh, and may be manufactured by agglomeration or impregnation techniques. Generally, granules will contain ½–25% toxicant and 0–25% of additives such as stabilizers, slow release modifiers, binding agents, etc. Emulsifiable concentrates usually contain, in addition to the solvent and, when necessary, co-solvent, 10–50% w./v. toxicant, 2–20% w./v. emulsifiers and 0–20% of appropriate additives such as stabilizers, penetrants and corrosion inhibitors. Pastes are componned so as to obtain a stable, flowable product and usually contain 10–60% toxicant, 2–20% of appropriate additives and, as carrier, water or an organic liquid in which the toxicant is substantially insoluble.

The compositions of the invention may contain other ingredients, for example protective colloids such as gelatin, glue, casein, gums and polyvinyl alcohol; sodium polyphosphates; cellulose ethers, stabilizers such as ethylene diamine tetra-acetic acid; other herbicides or pesticides; and stickers, for example, non-volatile oils.

Aqueous dispersions and emulsions, for example, compositions obtained by diluting a wettable powder or an emulsifiable concentrate according to the invention with water, also lie within the scope of the present invention. The said emulsions may be of the water-in-oil or the oil-in-water type, and may have a thick "mayonnaise"-like consistency.

The invention includes also a method of improving the yield of crops at a locus which comprises applying to the locus a 1,2,3-benzothiadiazole of the invention, or a biocidal composition containing such a compound.

Resolution of composition, formulation and application of the compositions and formulations are well within the skill of those versed in the pesticide and herbicide art.

The following examples are illustrative of the compounds of the invention, their preparation and herbicidal activity. In the preparative examples, "parts" meants parts by weight unless otherwise expressly indicated, and parts by weight bear the same relationship to parts by volume as does the kilogram to the liter. All elemental analyses are based on percent by weight.

EXAMPLE I

Preparation of 6-[1-(methylcarbamoyl)ethylamino]-5,7-dinitro-1,2,3-benzothiadiazole A solution of DL 2-amino-N-methylpropionamide (1 part) in ethanol (5 parts by volume) was added to a solution of 6-chloro-5,7-dinitro-1,2,3-benzothiadiazole (1 part) in ethanol (10 parts by volume). After allowing the reaction mixture to stand for 30 minutes, the resulting precipitate was filtered off and recrystallized from ethanol to yield the DL form of the desired product, which decomposed on heating above 180° C.

*Analysis.*—Calculated for $N_6SO_5C_{10}H_{10}$ (percent): C, 36.8; H, 3.1; S, 9.8. Found (percent): C, 36.5; H, 2.2; S, 9.9.

EXAMPLE II

Preparation of 6-[1-(carboxy)ethylamino]-7-nitro-1,2,3-benzothiadiazole 6-chloro-7-nitro-1,2,3-benzothiadiazole (5 parts) in ethanol (100 parts by volume, 5% aqueous) was warmed with sodium bicarbonate (12 parts) and DL-alpha-alanine (2.7 parts) for 1 hour. After cooling, the mixture was poured into water, filtered, and the aqueous solution acidified. The resultant precipitate was filtered off and recrystallized from ethanol to yield the DL form of the desired product, M.P. 202–3° C.

*Analysis.*—Calculated for $N_4SO_4C_9H_8$ (percent): C, 40.3; H, 3.0; N, 20.9; S, 11.9. Found (percent): C, 40.6; H, 3.1; N, 28.8; S, 12.1.

EXAMPLE III

Preparation of 6-[1-(dimethylcarbamoyl)ethylamino]-7-nitro-1,2,3-benzothiadiazole 6-[1-(carboxy)ethylamino]-7-nitro - 1,2,3 - benzothiadiazole (DL form prepared as in Example II) (1 part) was dissolved in benzene (15 parts by volume) and refluxed with thionyl chloride (3 parts by volume) for 3 hours. After evaporation of the benzene and excess thionyl chloride, the residue was dissolved in dichloromethane (20 parts by volume) and added slowly to a stirred solution of dimethylamine (5 parts by volume) in dichloromethane (10 parts by volume) at 0° C. Evaporation of the dichloromethane solution yielded a precipitate of the DL form of the desired product, which, on crystallization from ethanol, melted at 210–211° C.

*Analysis.*—Calculated for $N_5SO_3C_{11}H_{13}$ (percent): C, 44.7; H, 4.4; S, 10.8. Found (percent): C, 44.8; H, 4.4; S, 11.0.

EXAMPLE IV

Preparation of 5-chloro-6-ethoxycarbonylmethoxy-1,2,3-benzothiadiazole 5-chloro-6-hydroxy-1,2,3-benzothiadiazole (2.2 parts), sodium methoxide (0.7 part), ethyl bromoacetate (1.7 parts) and ethanol (100 parts by volume) were refluxed together for 6 hours. The ethanol was evaporated and the residue washed with water and extracted with ether. The ether solution was then evaporated and the residue crystallized from ethanol to yield the desired product, M.P. 123–124° C.

*Analysis.*—Calculated for $N_2SO_3ClC_{10}H_9$ (percent): C, 44.0; H, 3.3; S, 11.7; Cl, 13.0. Found (percent): C, 44.3; H, 3.6; S, 11.7; Cl, 13.4.

EXAMPLE V

Preparation of 5-chloro-6-carboxymethoxy-1,2,3-benzothiadiazole 5-chloro-6-ethoxycarbonylmethoxy - 1,2,3 - benzothiadiazole (2.4 parts, prepared as described in Example IV) was dissolved in ethanol (50 parts by volume) and hydrolyzed using sodium hydroxide (2 parts) in water (10 parts by volume) at reflux. After 3 hours the mixture was poured into water, acidified with concentrated hydrochloric acid and extracted with ether. The ether layer was washed with water, separated and dried. Evaporation then gave a solid which, on crystallization from ethanol, gave the desired product, M.P. 221–223° C.

*Analysis.*—Calculated for $N_2SO_3ClC_8H_5$ (percent): C, 39.3; H, 2.0; N, 11.4; S, 13.1. Found (percent): C, 39.3; H, 2.0; N, 11.6; S, 13.3.

EXAMPLE VI

Preparation of 5,7-dinitro-6-[1-(methylcarbamoyl)ethylthio]-1,2,3-benzothiadiazole 6-chloro-5,7-dinitro-1,2,3-benzothiadiazole (1 part) and N-methyl-2-thiopropionamide (DL form 0.5 part) were refluxed in aqueous ethanol with sodium bicarbonate (1 part) for one hour. After cooling, the resultant solid was filtered off and crystallized from ethanol to yield the DL form of the desired product, M.P. 168–169° C.

*Analysis.*—Calculated for $N_5S_2O_5C_{10}H_9$ (percent): C, 35.0; H, 2.6; N, 20.4; S, 18.6. Found (percent): C, 34.9; H, 2.4; N, 20.4; S, 18.7.

Following procedures analogous to those described in Examples I–VI, further compounds of the invention were prepared, whose physical characteristics are set out in the following Table 1.

TABLE 1

| Compound | Melting point, °C. | Analysis (percent by weight) |
|---|---|---|
| 6-chloro-5-ethoxycarbonylmethoxy-1,2,3-benzothiadiazole. | 126–127 | Calculated for $N_2SO_3ClC_{10}H_9$: C 44.0; H 3.3; N 10.3; S 11.7; Cl 13.0. Found: C 44.5; H 3.3; N 10.2; S 11.6; Cl 12.3. |
| 6-ethoxycarbonylmethoxy-1,2,3-benzothiadiazole. | 56–58 | Calculated for $N_2SO_3C_{10}H_{10}$: C 50.4; H 4.2; N 11.8; S 13.4. Found: C 48.6; H 4.3; N 11.6; S 13.2. |
| 7-chloro-6-ethoxycarbonylmethoxy-1,2,3-benzothiadiazole. | 95–96 | Calculated for $N_2SO_3ClC_{10}H_9$: C 44.0; H 3.3; Cl 13.0. Found: C 43.9; H 3.0; Cl 13.1. |
| 7-chloro-6-carboxymethoxy-1,2,3-benzothiadiazole. | 176–178 | Calculated for $N_2SO_3ClC_8H_5$: C 39.3; H 2.0; S 13.1; Cl 14.5. Found: C 39.4; H 2.2; S 13.3; Cl 14.5. |
| 6-[1-(methylcarbamoyl)ethylamino]-7-nitro-1,2,3-benzothiadiazole, DL form. | 207–208 | Calculated for $N_5SO_3C_{10}H_{11}$: C 42.7; H 3.9; S 11.4. Found: C 42.4; H 3.6; S 11.5. |
| 6-[1-(carboxy)ethylamino]-5,7-dinitro-1,2,3-benzothiadiazole. | [1] >180 | Calculated for $N_5SO_4C_9H_7$: C 34.5; H 2.2; S 10.2. Found: C 34.7; H 2.5; S 10.2. |
| 6-[1-(carbamoyl)ethylamino]-5,7-dinitro-1,2,3-benzothiadiazole, DL form. | [1] >190 | Calculated for $N_6SO_3C_9H_8$: C 34.6; H 2.6; S 10.2. Found: C 34.8; H 2.7; S 10.3. |
| 6-[1-(carbamoyl)ethylamino]-7-nitro-1,2,3-benzothiadiazole, DL form. | [1] >300 | Calculated for $N_5SO_3C_7H_9$: C 40.4; H 3.4; N 26.2; S 12.0. Found: C 40.0; H 3,6; N 25.6; S 11.0. |
| 5-chloro-4-ethoxycarbonylmethoxy-1,2,3-benzothiadiazole. | Oil | Calculated for $N_2SO_3ClC_{10}H_9$: C 44.0; H 3.3; S 11.7. Found: C 43.4; H 3.1; S 12.1 |
| 6-[1-(ethoxycarbonyl)ethoxy]-1,2,3-benzothiadiazole, DL form. | 64–65 | Calculated for $N_2SO_3C_{11}H_{12}$: C 52.4; H 4.8; S 12.7. Found: C 52.3; H 4.6; S 12.9. |
| 6-[3-(ethoxycarbonyl)propoxy]-5-chloro-1,2,3-benzothiadiazole. | 61–63 | Calculated for $N_2SO_3ClC_{12}H_{13}$: C 47.6; H 4.3; Cl 11.8. Found: C 47.8; H 4.3; Cl 11.8. |
| 6-[1-(carboxy)ethoxy]-5-chloro-1,2,3-benzothiadiazole, DL form. | 187–188 | Calculated for $N_2SO_3ClC_9H_7$: C 41.8; H 2.7; S 12.4. Found: C 41.8; H 2.6; S 12.7. |
| 6-[1-(ethoxycarbonyl)ethoxy]-5-chloro-1,2,3-benzothiadiazole, DL form. | 75–76 | Calculated for $N_2SO_3ClC_{11}H_{11}$: C 46.1; H 3.8; Cl 12.4. Found: C 45.9; H 3.7; Cl 12.7. |
| 6-[1-(carboxy)ethoxy]-1,2,3-benzothiadiazole, DL form. | 106–107 | Calculated for $N_2SO_3C_9H_8$: C 48.2; H 3.6; S 14.3. Found: C 47.8; H 3.4; S 14.2. |
| 6-[3-(ethoxycarbonyl)propoxy]-1,2,3-benzothiadiazole. | ([2]) | Calculated for $N_2SO_3C_{12}H_{14}$: C 54.1; H 5.3; S 12.0. Found: C 53.6; H 5.2; S 12.5. |
| 6-[3-(carboxy)propoxy]-1,2,3-benzothiadiazole. | 99–100 | Calculated for $N_2SO_3C_{10}H_{10}$: C 50.4; H 4.2; N 11.8; S 13.4. Found: C 48.4; H 3.9; N 11.0, S 13.1. |
| 6-ethoxycarbonylmethoxy-4-chloro-1,2,3-benzothiadiazole. | 98–100 | Calculated for $N_2SO_3ClC_{10}H_9$: C 44.0; H 3.3; N 10.3; S 11.7. Found: C 43.9; H 3.3; N 10.3; S 12.0. |
| 6-carboxymethoxy-4-chloro-1,2,3-benzothiadiazole. | 212–214 | Calculated for $N_2SO_3ClC_8H_5$: C 39,3; H 2,0; N 11.4; S 13.1. Found: C 39.3; H 2.1; N 11.7; S 12.8. |
| 6-carboxymethoxy-1,2,3-benzothiadiazole. | 187–190 | Calculated for $N_2SO_3C_8H_6$: C 45.7; H 2.9; N 13.3; S 15.2. Found: C 43.7; H 2.8; N 13.1; S 14.4. |
| 6-ethoxycarbonylmethoxy-5-methyl-1,2,3-benzothiadiazole. | 105–106 | Calculated for $N_2SO_3C_{11}H_{12}$: C 52.4; H 4.8; S 12.7. Found: C 52.8; H 5.0; S 13.0. |
| 6-carboxymethylthio-5-chloro-1,2,3-benzothiadiazole. | 219–221 | Calculated for $N_2S_3O_2ClC_8H_5$: C 36.8; H 1.9; S 24.5. Found: C 36.9; H 2.1; S 24.8. |
| 6-[2-(carboxy)ethylthio]-5-chloro-1,2,3-benzothiadiazole. | 192–193 | Calculated for $N_2S_2O_2ClC_9H_7$: C 39.3; H 2.6; S 23.3. Found: C 39.7; H 3.0; S 23.1. |

[1] Decanoic.
[2] B.P. 180-2/.015 mm.

EXAMPLE VII

Herbicidal activity

To demonstrate their herbicidal activity, the compounds of the invention were tested using, as a representative range of plants: oat (O; *Avena sativa*), ryegrass (RG; *Lolium perenne*), sweet corn (SD; *Zea mays*), pea (P; *Pisum sativum*), sugar beet (SB; *Beta vulgaris*), linseed (L; *Linum usitatissimum*), and mustard (M; *Sinapis alba*).

The tests fall into two categories, pre-emergence and post-emergence tests. The pre-emergence tests involve the spraying of a liquid formulation of the compound onto the soil in which the seeds of the plant species mentioned above have recently been sown. The post-emergence tests involved two types of tests, viz. soil drench and foliar spray tests. In the soil drench tests the soil was drenched with a liquid formulation containing a compound of the invention after the seeds of the plants species mentioned above had been germinated, in the foliar spray tests seedling plants were sprayed with such a formulation.

The formulations used in the above tests consisted of 50 parts by volume of acetone, 50 parts by volume of water, 0.5 part by weight of an alkylphenol/ethylene oxide condensate available under the trade name Triton X-155, and a compound of the invention in varying amounts.

The seeds of the plant species mentioned above were sown and allowed to germinate in steam-sterilized John Innes Compost.

In the soil spray and foliar spray tests two dosage levels, equivalent to 9 and 0.9 pounds of active material per acre respectively were applied in a volume equivalent to 65 gallons per acre. In the soil drench test one dosage level, equivalent to 18 pounds active material per acre, was applied at a volume equivalent to 235 gallons per acre.

Control tests were also carried out in which sown soil, soil bearing seedling plants, and plants were sprayed or drenched with the same volumes of compositions from which the compound of the invention had been omitted.

The herbicidal effects of the compounds concerned were assessed visually seven days after spraying the foliage and drenching the soil (post-emergence test) and eleven days after spraying the soil (pre-emergence test), and were recorded on a 0–9 scale (0=no effect and 9=very strong herbicidal effect), the results being given in Table 2. A rating 2 approximately corresponds to a reduction in fresh weight of stem and leaf of the treated plants of 25%, a rating 5 approximately corresponds to a reduction in weight of 55%, a rating 9 to a reduction in weight of 95%, etc.

TABLE 2

| Compound | Dosage lbs./acre | Pre-emergence (seeds) Soil Spray | | | | | | | Growth Inhibition Foliar Spray | | | | | | | Post-emergence (plants) | | | | | | | Dosage lbs./acre | Soil drench | | | | | | |
|---|---|---|---|---|---|---|---|---|---|---|---|---|---|---|---|---|---|---|---|---|---|---|---|---|---|---|---|---|---|---|
| | | SC | O | RG | P | L | M | SB | SC | O | RG | P | L | M | SB | SC | O | RG | P | L | M | SB | | SC | O | RG | P | L | M | SB |
| 6-carboxymethoxy-1,2,3-benzothiadiazole | 9 / 0.9 | 5/0 | 9/1 | 7/2 | 9/1 | 9/0 | 9/7 | 9/6 | 8/7 | 5/2 | 5/1 | 8/7 | 9/6 | 9/7 | 9/6 | 9/6 | 7/6 | 8/8 | 8/8 | 8/8 | 18 | 7 | 6 | 5 | 8 | 8 | 8 | 8 |
| 6-ethoxycarbonylmethoxy-1,2,3-benzothiadiazole | 9 / 0.9 | 0/2 | 1/7 | 5/5 | 1/5 | 9/3 | 7/8 | 6/8 | 7/2 | 2/1 | 1/0 | 7/4 | 8/7 | 7/7 | 8/6 | 6/8 | 3/3 | 3/2 | 3/3 | 8/7 | 5/7 | 7/7 | 18 | 3 | 3 | 2 | 3 | 8 | 5 | 7 |
| 6-carboxymethoxy-5-chloro-1,2,3-benzothiadiazole | 9 / 0.9 | 0/0 | 7/0 | 5/0 | 5/0 | 3/0 | 8/1 | 8/0 | 2/1 | 1/0 | 0/0 | 4/0 | 7/0 | 7/0 | 8/0 | 6/0 | 4/5 | 4/2 | 4/7 | 9/7 | 7/7 | 7/7 | 18 | 5 | 4 | 2 | 7 | 9 | 7 | 7 |
| 6-ethoxycarbonylmethoxy-5-chloro-1,2,3-benzothiadiazole | 9 / 0.9 | 8/0 | 0/0 | 9/0 | 0/3 | 9/3 | 4/0 | 9/1 | 7/1 | 3/1 | 2/0 | 9/4 | 7/7 | 8/8 | 9/6 | 9/5 | 2/1 | 1/1 | 0/0 | 8/7 | 7/7 | 7/7 | 18 | 2 | 1 | 2 | 0 | 8 | 5 | 5 |
| 6-ethoxycarbonylmethoxy-5-methyl-1,2,3-benzothiadiazole | 9 / 0.9 | 1/0 | 3/0 | 6/0 | 6/1 | 9/8 | 8/2 | 7/3 | 6/5 | 3/0 | 0/0 | 8/3 | 7/3 | 8/3 | 8/5 | 7/7 | 5/7 | 5/3 | 5/7 | 8/9 | 9/7 | 8/7 | 18 | 2 | 7 | 3 | 5 | 9 | 7 | 5 |
| 6-carboxymethoxy-7-chloro-1,2,3-benzothiadiazole | 9 / 0.9 | 0/0 | 1/0 | 0/0 | 1/0 | 3/3 | 3/4 | 3/0 | 0/0 | 4/1 | 0/0 | 2/0 | 5/1 | 5/0 | 3/0 | 1/1 | 0/0 | 0/0 | 0/0 | 5/1 | 1/0 | 6/1 | 18 | 0 | 0 | 0 | 0 | 5 | 1 | 6 |
| 4-ethoxycarbonylmethoxy-1,2,3-benzothiadiazole | 9 / 0.9 | 0/0 | 0/0 | 3/0 | 0/0 | 8/3 | 0/2 | 8/2 | 7/0 | 0/0 | 0/0 | 0/0 | 8/3 | 5/3 | 3/3 | 8/3 | 4/2 | 2/0 | 5/0 | 9/5 | 7/5 | 5/2 | 18 | 4 | 2 | 0 | 5 | 9 | 7 | 2 |
| 6-[3-(ethoxycarbonyl)propoxyl]-1,2,3-benzothiadiazole | 9 / 0.9 | 2/0 | 6/0 | 4/0 | 5/0 | 4/0 | 8/0 | 9/0 | 0/0 | 7/0 | 3/1 | 0/1 | 8/3 | 7/3 | 7/3 | 8/3 | 2/1 | 4/2 | 2/1 | 3/2 | 2/4 | 4/3 | 18 | 4 | 2 | 0 | 3 | 2 | 1 | 4 |
| 6-[1-(ethoxycarbonyl)ethoxyl]-1,2,3-benzothiadiazole | 9 / 0.9 | 1/0 | 2/0 | 1/0 | 3/0 | 5/2 | 0/1 | 0/0 | 4/0 | 4/0 | 2/1 | 0/1 | 0/0 | 3/3 | 1/1 | 8/1 | 3/3 | 3/2 | 2/2 | 4/4 | 5/3 | 7/5 | 18 | 4 | 2 | 1 | 2 | 4 | 3 | 5 |
| 6-[1-(carboxy)ethoxyl]-1,2,3-benzothiadiazole | 9 / 0.9 | 7/0 | 5/0 | 0/0 | 7/0 | 8/0 | 9/0 | 9/0 | 7/1 | 1/1 | 4/0 | 7/8 | 9/0 | 6/0 | 6/0 | 7/5 | 7/5 | 5/5 | 5/5 | 9/8 | 9/8 | 8/5 | 18 | 7 | 5 | 4 | 5 | 8 | 7 | 7 |
| 6-[1-(ethoxycarbonyl)ethoxyl]-5-chloro-1,2,3-benzothiadiazole | 9 / 0.9 | 7/0 | 8/0 | 2/0 | 9/0 | 9/0 | 9/0 | 8/0 | 7/0 | 1/0 | 4/0 | 3/1 | 9/7 | 6/7 | 8/5 | 8/6 | 5/5 | 5/6 | 2/3 | 9/2 | 9/7 | 6/7 | 18 | 5 | 6 | 3 | 2 | 9 | 7 | 6 |
| 6-[1-(carboxy)ethoxyl]-5-chloro-1,2,3-benzothiadiazole | 9 / 0.9 | 6/0 | 5/0 | 8/0 | 9/0 | 9/0 | 9/0 | 9/0 | 5/0 | 4/0 | 3/1 | 1/1 | 9/9 | 7/7 | 8/7 | 7/3 | 6/3 | 2/2 | 8/6 | 7/7 | 7/7 | 7/7 | 18 | 6 | 6 | 2 | 8 | 7 | 7 | 6 |
| 6-[1-(ethoxycarbonyl)ethoxyl]-5-chloro-1,2,3-benzothiadiazole | 9 / 0.9 | 1/0 | 2/0 | 8/0 | 9/0 | 9/0 | 9/0 | 3/0 | 2/0 | 1/0 | 5/2 | 9/9 | 8/7 | 3/8 | 3/8 | 3/8 | 6/3 | 3/3 | 3/6 | 8/7 | 7/8 | 7/7 | 18 | 6 | 3 | 3 | 6 | 8 | 8 | 7 |

EXAMPLE VIII

Growth regulant activity

Wheat seeds (cv. Opal) were soaked in distilled water at room temperature for 2 hours in darkness. The seeds were then evenly spaced out on four layers of moistened filter paper in rectangular plastic dishes 12" x 6" x 3". The dishes were placed in an incubator at 27° C. for 72 hours. The filter paper was re-moistened when necessary.

The coleoptiles were cut by a small cutter, which consisted of two razor blades 10 mm. apart, one of the blades being 3 mm. from a perspex upright. Coleoptiles approximately 20 mm. in length were carefully selected from the dishes and aligned on a moistened glass slide (3" x 1"), the apices against one edge of the slide. The slide was then inverted onto the razor blades, the apices towards the upright, to obtain 10 mm. coleoptile segments from 3 mm. below the apex.

The 10 mm. coleoptile lengths were soaked in distilled water for 1 hour, drained, and thoroughly washed twice with distilled water. Five coleoptiles were added to each Petri dish containing the test solutions prepared as follows.

The compounds under test were dissolved in 2 ml. of acetone and then made up to 100 ml. with a pH 5.0 buffer solution containing: (a) 898 mg. anhydrous dipotassium hydrogen phosphate (0.01 M); (b) 510 mg. citric acid (monohydrate) (0.005 m.); and (c) 20 g. sucrose (2%) per liter of distilled water. The starting concentration was $10^{-4}$ M, $10^{-5}$ M, $10^{-6}$ M, $10^{-7}$ M and $10^{-8}$ M, being obtained by serial dilution with 2% acetone buffer. Two replicate dishes were used at each concentration. Each dish contained:

(1) filter paper circle,
(2) 4 ml. appropriate test solution,
(3) five 10 mm. coleoptile lengths.

The dishes were shaken gently while incubated in the dark at 25° C.

After 21 hours the coleoptile lengths were measured to the nearest 0.5 mm. The average length per dish was calculated and the figures for the two replicates averaged to obtain a treatment mean. Control extension growth i.e. final minus initial length (10 mm.) was taken as 100%. Similarly the starting length was subtracted from each treatment mean and treatment growth was calculated in terms of a percentage of control growth. The results of these tests are shown in Table 3.

TABLE 3

| | Growth extension as percentage of control, molar concentration | | | | |
|---|---|---|---|---|---|
| | $10^{-4}$ | $10^{-5}$ | $10^{-6}$ | $10^{-7}$ | $10^{-8}$ |
| 6-carboxymethoxy-1,2,3-benzothiadiazole | 107 | 112 | 108 | 107 | 91 |
| 6-ethoxycarbonylmethoxy-1,2,3-benzothiadiazole | 111 | 139 | 111 | 107 | 100 |
| 6-carboxymethoxy-5-cloro-1,2,3-benzothiadiazole | 172 | 165 | 107 | 97 | 101 |
| 6-ethoxycarbonylmethoxy-5-chloro-1,2,3-benzothiadiazole | 151 | 187 | 144 | 108 | 105 |
| 6-[1-(carboxy)ethoxy]-1,2,3-benzothiadiazole | 123 | 111 | 103 | 92 | 103 |
| 6-[1-(ethoxycarbonyl)ethoxy]-1,2,3-benzothiadiazole | 127 | 128 | 114 | 106 | 104 |
| 6-[1-(carboxy)ethoxy]-5-chloro-1,2,3-benzothiadiazole | 178 | 156 | 117 | 106 | 94 |
| 6-[1-(ethoycarbonyl)ethoxy]-5-chloro-1,2,3-benzothiadiazole | 123 | 184 | 128 | 108 | 105 |

We claim as our invention:

1. The 1,2,3-benzothiadiazole of the formula

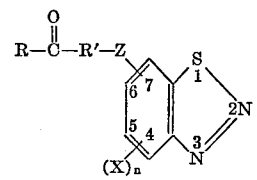

wherein R is hydroxy, alkoxy, amino, monoalkylamino or dialkylamino in which all of the alkyl moieties are of 1–10 carbon atoms; R' is alkylene of 1–6 carbon atoms; Z is oxy, thio or imino; X is halogen, nitro or alkyl of 1–6 carbon atoms; n is 0–3; and alkali metal salts thereof when R is hydroxy.

2. The 1,2,3-benzothiadiazole of claim 1 wherein R is hydroxy, alkoxy, amino, monoalkylamino or dialkylamino in which all of the alkyl moieties are of 1–10 carbon atoms, R' is alkylene of 1–6 carbon atoms; X is middle halogen, nitro or alkyl of 1–6 carbon atoms; and n is 0–2.

3. The 1,2,3-benzothiadiazole of claim 2 wherein R is hydroxy, alkoxy, amino, monoalkylamino, or dialkylamino in which all of the alkyl moieties are of 1–4 carbon atoms, R' is alkylene of 1–4 carbon atoms; and X is middle halogen, nitro or alkyl of 1–4 carbon atoms.

4. The 1,2,3-benzothiadiazole of claim 3 wherein Z is oxy and is in the 6-position, X is in the 5-position and n is 0 or 1.

5. The 1,2,3-benzothiadiazole of claim 4 wherein R is hydroxy or ethoxy; R' is methylene, ethylidene or trimethylene; and X is chlorine or methyl.

6. The 1,2,3-benzothiadiazole of claim 5 wherein R is ethoxy, R' is methylene, X is chlorine, and n is 1.

7. The 1,2,3-benzothiadiazole of claim 5 wherein R is ethoxy, R' is ethylidene, X is chlorine, and n is 1.

8. The 1,2,3-benzothiadiazole of claim 5 wherein R is ethoxy, R' is methylene and n is 0.

References Cited

UNITED STATES PATENTS 3,275,647  9/1966  Hackmann et al. _____ 260—304

ALEX MAZEL, Primary Examiner

R. J. GALLAGHER, Assistant Examiner

U.S. Cl. X.R.

71—90